Dec. 17, 1968    R. J. GREENLEAF    3,416,492
COATING APPARATUS FOR THREADED FASTENERS
Filed April 21, 1967    2 Sheets-Sheet 1

INVENTOR.
Richard J. Greenleaf
BY
Kenway, Jenney & Hildreth
Att'ys

Dec. 17, 1968 R. J. GREENLEAF 3,416,492
COATING APPARATUS FOR THREADED FASTENERS
Filed April 21, 1967 2 Sheets-Sheet 2
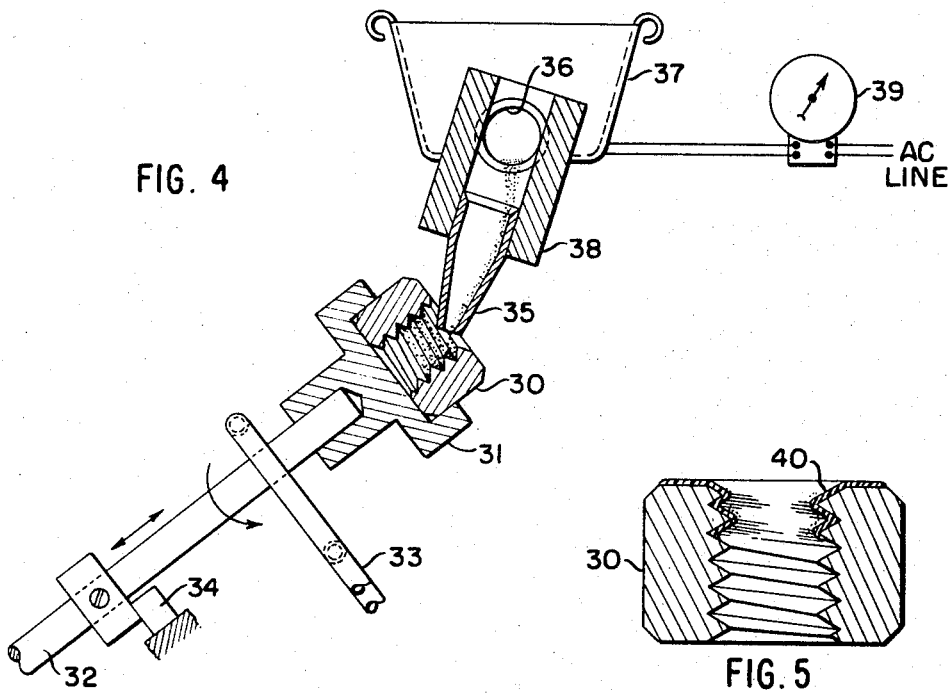
FIG. 4
FIG. 5
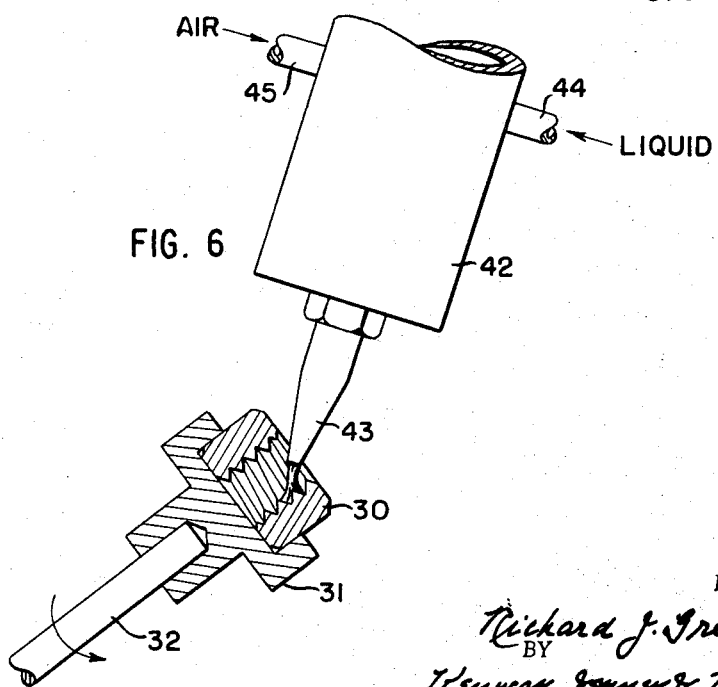
FIG. 6
INVENTOR.
Richard J. Greenleaf
BY
Kenway, Jenney & Hildreth
Attys.

United States Patent Office 3,416,492
Patented Dec. 17, 1968

3,416,492
COATING APPARATUS FOR THREADED FASTENERS
Richard J. Greenleaf, Ipswich, Mass., assignor to International Fastener Corp., Kenilworth, N.J., a corporation of New Jersey
Filed Apr. 21, 1967, Ser. No. 632,651
4 Claims. (Cl. 118—620)

ABSTRACT OF THE DISCLOSURE

Apparatus for applying a torque-controlling coating or sealing coating to a threaded element, characterized by means for spinning the element about its axis and heating an intermediate section while delivering a plastic material to a predetermined 360° area thereof.

---

This invention comprises a new and improved apparatus for applying a plastic torque-controlling or sealing coating to a threaded element, such as a bolt or nut. It is well known that a coating of nylon or other polyamide resin improves the torque characteristic of threaded connections, as by maintaining it at a high and uniform degree throughout repeated removals and insertions.

An object of the present invention is to provide apparatus for automatically applying, curing and bonding by fusion an accurately measured charge of a plastic coating of uniform thickness to a 360° surface of a predetermined section of a threaded bolt or nut. The coating may be of thermoplastic or thermosetting character depending on the end use of the product.

The apparatus of my invention is characterized by means for holding a threaded element by end engagement and spinning it about its axis, together with means for heating a section of the element adjacent to the holding means and applying a torque-controlling coating of plastic material in a strictly defined area to a complete circumferential heated section of the spinning element.

It has been found highly desirable to apply the plastic coating to a complete circumferential area of the threaded element, as is done by the apparatus of my invention, because the coating fills all voids in the contour of the threads and imparts an effective sealing feature to the resulting connection.

The timing of the applying step is of critical importance in the successful operation of the apparatus. The invention therefore includes an automatic timer by which the period of application and therefore the amount of the coating material may be regulated to the fraction of a second.

Such apparatus has the advantage of subjecting each threaded element to substantially instantaneous coating treatment under uniform conditions of heat with initial and reliable bonding of plastic to metal.

The features of this novel apparatus will be best understood and appreciated from the following description of preferred embodiments thereof selected for purposes of illustration and shown in the accompanying drawings, in which:

FIG. 4 is a diagrammatic view of apparatus constructed and arranged for treating a threaded nut, FIG. 5 is a sectional view of an end-coated nut, and FIG. 6 is a diagrammatic view of apparatus for applying a coating from a liquid source of supply.

Figure 1:
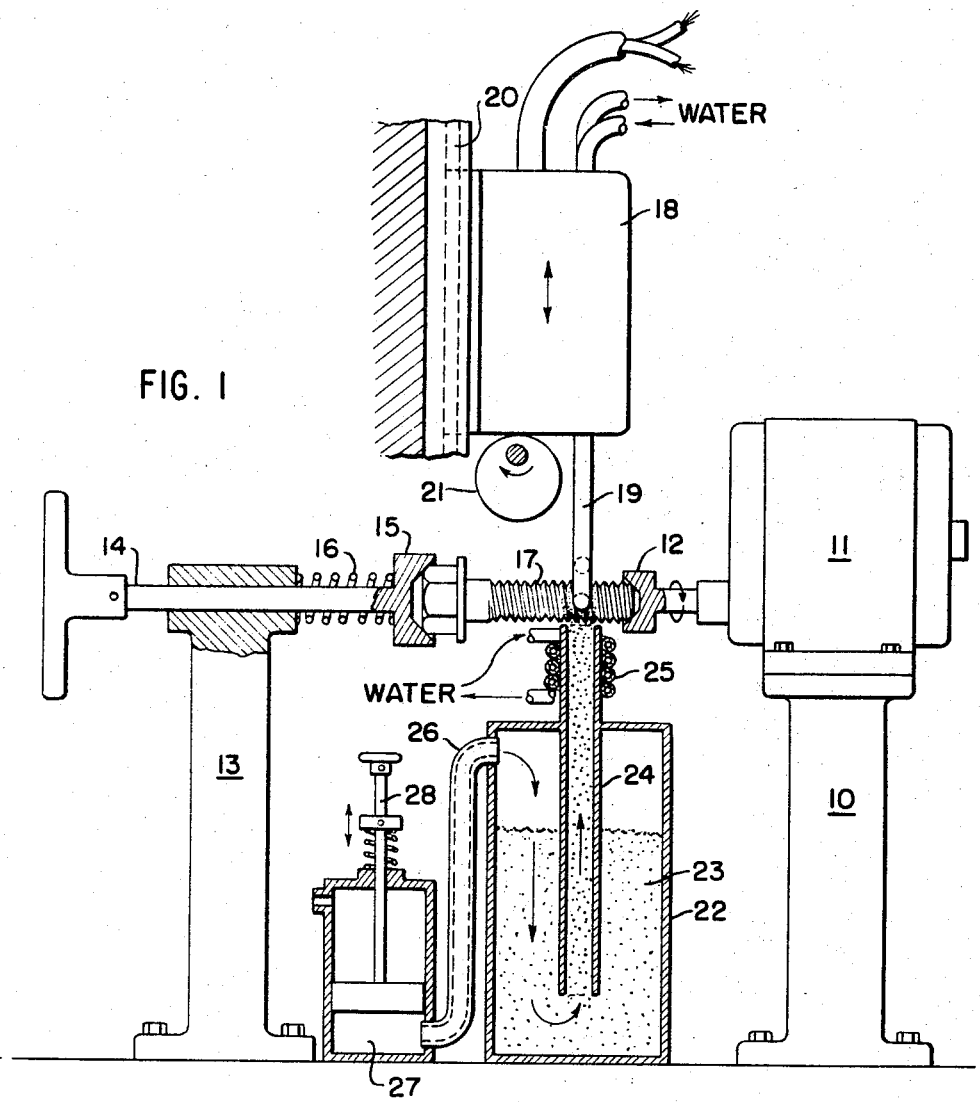
FIG. 1 is a diagrammatic view in elevation of apparatus for treating a threaded bolt.

As shown in FIG. 1 the apparatus comprises a standard 10 upon which is mounted a motor 11 carrying a driven chuck 12. A second standard 13 carries a freely rotatable tail stock 14 carrying a chuck 15. The tail stock is urged toward the right as shown in FIG. 1 by a compression spring 16 so that a threaded bolt 17 may be engaged at its opposite ends between the chucks 12 and 15 and spun about its axis while leaving an intermediate threaded section of the bolt fully exposed.

Figure 2:
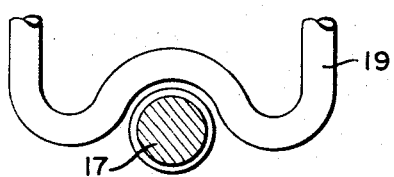
FIGS. 2 and 3 are detailed fragmentary views.

An induction heater 18 is mounted for vertical movement in guideways 20 and provided with a forked heating element 19 curved at its end to correspond with the contour of the bolt 17 as shown in FIG. 2. An eccentric 21 engages the bottom of the heater 18 and lifts it intermittently to clear the coated bolt and permit removal from and replaceable between the chucks 12 and 15.

Figure 3:
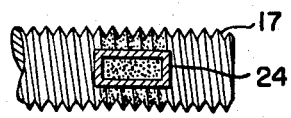

A canister container 22 for powdered nylon 23 in aerosol condition is located between the standards 10 and 13. It is provided with a standpipe or tube 24 having a nozzle at its upper end disposed in close proximity to the lower side of the bolt 17 opposite to the heater. As shown in FIG. 3 the nozzle is rectangular so that it acts to deliver a narrow band of nylon spray of the same contour to the underside of the bolt in an intermediate area of its thread.

A pressure tube 26 leads to the canister from a pump 27 shown conventionally as having a plunger 28 and this may be depressed by any convenient means from time to time as it is desired to emit and deliver a measured charge of nylon powder in aerosol condition from the nozzle to the heated surface of the bolt 17.

The apparatus above described has the advantage of applying a torque-controlling coating which is continuous and of uniform thickness about a complete 360° section of the bolt. Threaded elements so treated have been found superior in uniformity of torque to elements having only a patch of circumferentially limited area of coating.

For example, a 3/8–16 bolt treated as above described and set with an initial torque of 60 inch pounds will be found to have a first back-off torque of about 50 inch pounds and thereafter an almost constant back-off torque of 25 inch pounds thereafter.

It will be understood that the pump 27 may be adjusted in its stroke and timing to deliver a measured charge as a puff of the aerosol nylon to each bolt or other threaded element. Satisfactory results are secured by rotating a 1/4 bolt at 180 r.p.m., i.e. one stroke of the pump to two complete turns of the bolt. In any case a timer or time controlling means is a desirable and important part of the apparatus. Thus the application of the coating aerosol may be restricted to one or more revolutions of the treated element.

In FIG. 4 the apparatus is shown as organized for coating an annular area including about three threads of a nut 30. The nut is shown as seated in a chuck 31 carried at the end of a shaft 32 by which it is rotated and moved to and from operative position. An electric heating unit 33 surrounds the shank of the retracted chuck 31 and is energized to maintain the nut at the fusion temperature of the nylon or other plastic compound to be applied. A fixed stop 34 determines the advanced operative position of the shaft 32 and its chuck.

In this instance the powdered nylon is supplied to the nut through the medium of an overhead nozzle 35. The nozzle leads downwardly from a forwardly inclined tube 36 which constitutes the outlet of a vibrating hopper 37. The tube 36 is enclosed in a channeled bracket 38 connected to the hopper and these elements are organized as a Sintron assembly vibrating at a high rate so that the powdered contents of the hopper is advanced in a steady stream and discharged from the nozzle 35 upon or into a threaded area of the spinning element beneath it.

The operation of the system is controlled electrically by a timer 39 which causes the period of discharge to synchronize with the movement of the chuck 31 in presenting and withdrawing the nut 30 to and from its operative position as shown.

The apparatus is adjusted as shown in FIG. 4 to apply a coating 40 to the two outer threads of the nut, and if desired the coating may be carried up and over the top face of the nut.

Nylon resin sold under the trade name "Zytel" is well suited for the practice of this invention. It is produced as a molding or extruding powder in many grades, and by way of example in three grades having melting points respectively of 405°–425° F.; 475°–495° F. and 390°–425° F. In using the apparatus of this invention the temperature of the threaded surface to which the nylon is applied will be slightly in excess of the melting point of the selected nylon.

It will be understood that power-operated means are provided for rotating the shaft 32 and advancing it to and from the operative position shown in FIG. 4 in which the heated and spinning nut is located in the proper position to receive a spray of nylon powder from the nozzle 35. The period of nylon flow is governed by setting of the timer 39 and this may be sufficient for one or more complete revolutions of the nut. In any case a coating of uniform thickness is applied to a complete 360° area of the threads and immediately fused into permanent union therewith. The coated nut is withdrawn and replaced while the nozzle and Sintron parts remain at rest.

In FIG. 6 is shown a nozzle construction particularly adapted for supplying a torque-controlling or sealing coating to a threaded element from a liquid source of supply. This may include a cylindrical reservoir 42 having a nozzle 43 directed downwardly toward a rotatable chuck 31 carried as before by the shaft 32.

A supply tube 44 for the liquid material leads to one side of the reservoir 42 and a compressed air tube 45 leads into the other side. A timer such as that shown in FIG. 6 is included in the supply tube and this operates to eject in each cycle a few drops or a puff of liquid spray of the coating material.

A particular advantage of applying a coating which is complete and unbroken in a circumferential area is that it prevents any galling due to metal-to-metal contact in the locking area. It also obviates stripping of the coating that sometimes results from imperfection or roughness in thread contour where the coating is not circumferentially continuous. All these advantages flowing from my invention means less damage to locking elements in repeated usage.

Having thus disclosed my invention what I claim as new and desire to secure by Letters Patent is:

1. Coating apparatus for threaded elements, comprising means for holding a threaded element by end engagement and spinning it about its axis, a heater mounted for movement to and from one side of the spinning element, an opposed nozzle directed to the other side of the element from the heater, and means for delivering from the nozzle a measured charge of powdered plastic material and applying it to a strictly defined threaded area of the now heated element.

2. Coating apparatus as described in claim 1, further characterized by the provision of a cooling coil located adjacent to the nozzle.

3. Coating apparatus as described in claim 1, further characterized by the provision of a pump for intermittently generating air pressure to deliver limited charges of the plastic material in puffs against the spinning element.

4. Coating apparatus as described in claim 1, further characterized in that the nozzle is elongated in a direction parallel to the axis of the spinning element thereby being adapted to deliver a narrow band of nylon spray to an intermediate 360° section of the threaded area.

References Cited

UNITED STATES PATENTS

| | | | |
|---|---|---|---|
| 2,422,417 | 6/1947 | Hutchinson. | |
| 3,220,381 | 11/1965 | Alholm | 118—318 |
| 3,245,824 | 4/1966 | Treat et al. | 118—308 X |
| 3,310,431 | 3/1967 | Loose | 118—308 X |
| 3,311,085 | 3/1967 | Smith | 118—318 X |

FOREIGN PATENTS

| | | |
|---|---|---|
| 1,243,550 | 9/1960 | France. |

WALTER A. SCHELL, *Primary Examiner.*

J. McINTOSH, *Assistant Examiner.*

U.S. Cl. X.R.

118—308, 318, 320